United States Patent [19]

Matsumoto et al.

[11] Patent Number: 5,023,214
[45] Date of Patent: Jun. 11, 1991

[54] SILICON NITRIDE CERAMICS CONTAINING A METAL SILICIDE PHASE

[75] Inventors: Roger L. K. Matsumoto, Newark; Allan B. Rosenthal, Wilmington, both of Del.

[73] Assignee: Hercules Incorporated, Wilmington, Del.

[21] Appl. No.: 336,397

[22] Filed: Apr. 11, 1989

[51] Int. Cl.$^5$ .............................................. C04B 35/58
[52] U.S. Cl. ........................................ 501/97; 501/96; 501/98
[58] Field of Search ............................... 501/96, 97, 98

[56] References Cited

U.S. PATENT DOCUMENTS

| 3,409,417 | 11/1968 | Yates | 29/182.5 |
| 4,332,909 | 6/1982 | Nishida et al. | 501/97 |
| 4,487,971 | 10/1983 | Komatsu et al. | 501/97 |

FOREIGN PATENT DOCUMENTS

| 262654 | 4/1981 | European Pat. Off. . |
| 71997 | 2/1983 | European Pat. Off. . |
| 58064269 | 10/1981 | Japan . |
| 57200266 | 8/1982 | Japan . |
| 477379 | 10/1969 | Switzerland . |

Primary Examiner—William R. Dixon, Jr.
Assistant Examiner—Chris Gallo
Attorney, Agent, or Firm—Joanne W. Patterson

[57] ABSTRACT

Disclosed is a sintered ceramic product comprising (a) 20-98 percent by weight silicon nitride, (b) 1-80 percent by weight of a silicide of iron, cobalt or nickel and (c) 0.02-20 parts by weight of at least one oxide, nitride, or silicate of an element of IUPAC groups 2, 3, 4, 13 or the lanthanide series. A method for making such a product is also disclosed.

13 Claims, No Drawings

SILICON NITRIDE CERAMICS CONTAINING A METAL SILICIDE PHASE

FIELD OF THE INVENTION

This invention relates to sintered silicon nitride ceramics. This invention particularly relates to sintered ceramic products suitable for making cutting tools, comprising a silicon nitride matrix, a metal silicide phase and a metal oxide, nitride and/or silicate phase.

BACKGROUND OF THE INVENTION

Silicon nitride is of great interest for structural and electronic applications because of its excellent high temperature strength, good thermal shock resistance, good wear resistance and chemical inertness. Silicon nitride materials have been traditionally fabricated by one of three methods: (1) the direct nitridation of silicon powder at high temperatures, (2) densification of commercially available silicon nitride powder at high temperatures by the addition of metal oxide powders known as sintering aids (sintering aids promote densification of the silicon nitride by providing a liquid phase during sintering) and (3) densification of commercially available silicon nitride powder at high temperatures and pressures (hot pressing). These silicon nitride materials have been used in structural applications such as cutting tools and gas turbines. However, these materials suffer brittle fracture, which limits their usefulness in commercial applications.

The brittleness of a ceramic can be decreased by introducing a secondary phase such as ceramic whiskers, fibers or particulates. These additives act as toughening agents by absorbing energy during crack propagation. The mechanical properties of a ceramic can also be improved by introducing a compatible metal phase. Such ceramic/metal composites or "cermets" provide the strength and ductility of a metal combined with the hardness and chemical inertness of a ceramic. For example, U.S. Pat. No. 4,332,909 discloses a composition consisting of silicon nitride, at least one oxide of yttrium, scandium, cerium, lanthanum and the metal oxides of the lanthanide series, and at least one metal or metal oxide of iron, nickel and cobalt. When large amounts of the metals or metal oxides are used, they form a net-like continuous structure in the silicon nitride. U.S. Pat. No. 3,409,417 discloses a dense, refractory composition of silicon nitride and a sintering aid, bonded with iron, cobalt, nickel, chromium, rhenium, tungsten, molybdenum or their alloys. The composition can be used to prepare cutting tools Japanese unexamined patent application 58/64,270 describes a silicon nitride sintered product prepared from a mixed powder of at least one metal oxide, at least one metal silicide and the remainder silicon nitride. The metal silicide decomposes during sintering to produce a metal layer on the surface of the product. Russian patent 485,999 discloses a cermet composition comprising 16-20 wt. % Fe, 12-18% $Si_3N_4$ filamentary crystals and the balance $ZrO_2$, prepared by hot pressing a powder mixture. While cermets such as those shown in these prior art references offer distinct mechanical property advantages over single component ceramics at ambient and modestly high temperatures, their toughness, wear resistance and strength are often degraded sufficiently at temperatures greater than 1000° C. to render them unusable in a variety of structural applications.

SUMMARY OF THE INVENTION

It has now been found that a sintered ceramic product exhibiting high strength, toughness and hardness at elevated temperatures can be prepared by (1) preparing a powder mixture comprising (a) from about 20 to about 98 percent silicon nitride, (b) from about 1 to about 80 percent of at least one metal selected from the group consisting of Fe, Ni and Co, or an oxide or alloy thereof, and (c) from 0.02 to about 20 percent of at least one oxide, nitride or silicate of an element selected from IUPAC groups 2, 3, 4, 13 or the lanthanide series, all parts being by weight based on the total weight of the product, and (2) reacting the components of the powder mixture by heating to a temperature of 1300–1700° C. in a non-oxidizing atmosphere. The product that is formed is composed of a metal silicide phase interdispersed in a silicon nitride matrix.

DETAILED DESCRIPTION OF THE INVENTION

The silicon nitride used in the process of this invention can be any commercially available silicon nitride powder. The silicon nitride is used in an amount of from about 20 to about 98 parts by weight, based on the total weight of the composition.

Other refractory compounds, which can be chemically stable or unstable, can replace up to 50% by weight of the silicon nitride. For example, nitrides such as aluminum nitride, titanium nitride and boron nitride; carbides such as silicon carbide, titanium carbide and boron carbide; and borides such as titanium diboride, molybdenum diboride, and zirconium diboride can be used to replace silicon nitride. The refractory compound can be chosen to enhance a particular property of the resulting composite. For example, including titanium carbide or silicon carbide in the composition will give a harder product.

The silicon nitride powder is mixed with from about 1 to about 80 parts by weight, preferably 5–25 parts, based on the total weight of the composition, of Fe, Ni or Co metal. An oxide of the metal or an alloy of these metals with each other or with another metal can also be used.

The powder mixture also includes from 0.02 to about 20 percent by weight, preferably from 1 to about 10 percent, based on the total weight of the composition, of a sintering aid. Amounts higher than about 20% degrade the mechanical properties of the sintered product. The sintering aid is an oxide, nitride or silicate of an element of IUPAC groups 2(alkaline earths), 3(Sc, Y, La, Ac), 4(Ti, Zr, Hf), 13(B, Al, Ga, In, Tr), or the lathanide series, or mixtures thereof. Oxides of aluminum, magnesium, hafnium, calcium, strontium, zirconium and yttrium are preferred. Aluminum oxide is most preferred. The silicate sintering aid can be added as such or can be formed in situ by the reaction of an oxide or nitride sintering aid with the silica that is always present on the surface of the silicon nitride powder. When a nitride sintering aid is used, it is sometimes desirable to add silica in addition to that which is inherently present on the surface of the silicon nitride. IUPAC group 1 oxides can be substituted for any of the oxide, nitride or silicate sintering aids in an amount of up to 50% by weight.

A binder can be added to the powder mixture as a processing aid during subsequent molding of the material. Suitable binders include, but are not limited to, paraffin and other waxes. The amount of binder used is preferably less than 5% by weight, based on the total weight of the composition.

In order to impart optimum properties to the sintered product, the ingredients used to prepare the initial mixture should be finely divided, preferably having a particle size of less than 5 microns, most preferably less than 1 micron.

In order to produce a sintered product of suitable quality, it is important that the finely divided ingredients of the initial mixture be intimately mixed. The ingredients are placed in a mill with a sufficient volume of an aqueous or non-aqueous liquid to form a thick slurry and are milled for 1-48 hours, depending on the particle size desired. Typical liquids useful for non-aqueous milling include, but are not limited to, ethanol, 1,1,1-trichloroethane and methylene chloride. A commercially available dispersant such as HYPERMER KD-2 amine dispersant (ICI Americas) can be added if desired. Suitable mills include, but are not limited to, ball mills, vibratory mills, and attrition mills. Ball and vibratory mills are preferred.

After milling, the slurry that is produced is spray dried to form a free flowing powder. Agglomerates are then removed by sieving the powder through a 200 mesh screen.

The powder mixtures of this invention are preferably densified by simultaneously heating and pressing. The preferred processing techniques are therefore hot-pressing, hot isostatic pressing and gas pressure sintering. However, cold pressing followed by pressureless sintering will also yield the product of this invention.

The preferred sintering temperature for all of these methods is from 1300-1700° C. If the sintering temperature is too low, densification will be incomplete. If the sintering temperature is too high, the silicon nitride will decompose. The sintering is preferably carried out at a pressure of at least 1000 psi, most preferably 2000-6000 psi. A non-oxidizing atmosphere such as nitrogen, hydrogen or helium is used to prevent oxidation of the metals and the silicon nitride. A nitrogen atmosphere is preferred.

The sintered ceramic product comprises (a) from about 20 to about 98 percent silicon nitride, (b) from about 1 to about 80 percent of a silicide of at least one meal selected from the group consisting of iron, nickel and cobalt, and (c) from 0.02 to about 20 parts of a least one oxide, nitride or silicate of an element selected from IUPAC groups 2, 3, 4, 13 or the lanthanide series, all percentages being by weight based on the total weight of the product. The product is composed of a silicon nitride matrix, microscopic "islands" of metal silicide and a metal oxide, nitride and/or silicate phase at the boundaries between the silicon nitride grains. In contrast to the materials taught in the prior art, there is no continuous three dimensional metal or metal oxide phase in the sintered product of this invention. While the exact mechanism is not known, this morphology is believed to occur via a high temperature disproportionation reaction promoted by the sintering aid. The sintering aid provides a liquid phase during heating, which acts as a high temperature "solvent" for both the nitride and the metal (or metal oxide or alloy) and promotes the reaction of silicon nitride with the metal to form metal silicides. Upon cooling, the liquid sintering aid forms a glass at the silicon nitride grain boundaries. The X-ray diffraction pattern of the sintered product indicates that the product is a composite of silicon nitride and any of a number of metal silicides of varied stoichiometry, e.g., a combination of $CoSi_2$, $CoSi$ and $Co_2Si$.

The sintered ceramic material of this invention has a wide variety of applications in the structural ceramics area. Because the material has a theoretical density of less than 5, it is suitable for uses where a high strength/weight ratio is important. The unique mechanical properties of the product make it especially suited for use in the manufacture of cutting tools. The material can also be used in the manufacture of turbine engines, valve seals and other parts requiring exceptional wear resistance.

EXAMPLES 1-16

Samples (500 g) of the compositions listed below are milled for 24 hours in equal concentrations by volume of 1,1,1-trichloroethane on a Southwest Engineering Company (SWECO) vibratory mill. The resulting slurries are spray dried to form a free flowing powder. The powders are hot pressed at 4000 psi and 1500° C. under nitrogen to produce a 45 cm×45 cm×6 mm billet (Examples 1-14). In Examples 15 and 16, the powder is cold pressed at 5000 psi and sintered at atmospheric pressure under nitrogen at 1600° C. The density of each billet is determined using a displacement technique (ASTM C 373-56) and the Rockwell A hardness is measured. The flexural strength of the product of Example 14 is measured using test method MIL-STD 1942 and is found to be 619 MPa.

| Example No. | Composition (wt. %) | | | | | | | | | Density (g/cc) | Hardness (Rockwell A) |
|---|---|---|---|---|---|---|---|---|---|---|---|
| | $Si_3N_4$ | Co | $Al_2O_3$ | MgO | CaO | SrO | $ZrO_2$ | $Y_2O_3$ | $SiO_2$ | | |
| 1 | 78.0 | 22.0 | — | — | — | — | — | — | — | 3.09 | Brittle |
| 2 | 74.0 | 21.0 | 5.0 | — | — | — | — | — | — | 3.15 | 83.2 |
| 3 | 73.2 | 22.5 | 2.5 | 1.8 | — | — | — | — | — | 3.48 | 92.5 |
| 4 | 72.5 | 22.5 | 2.5 | — | 2.5 | — | — | — | — | 3.33 | 92.0 |
| 5 | 70.6 | 22.5 | 2.4 | — | — | 4.5 | — | — | — | 3.31 | 92.0 |
| 6 | 71.5 | 22.5 | 2.5 | 0.9 | — | — | 2.7 | — | — | 3.48 | 92.5 |
| 7 | 71.2 | 22.5 | 2.5 | — | 1.2 | — | 2.7 | — | — | 3.37 | 93.0 |
| 8 | 70.3 | 22.5 | 2.3 | — | — | 2.2 | 2.6 | — | — | 3.40 | 92.0 |
| 9 | 71.4 | 22.5 | 4.5 | 1.7 | — | — | — | — | — | 3.42 | 93.5 |
| 10 | 70.8 | 22.5 | 4.4 | — | 2.3 | — | — | — | — | 3.30 | 92.0 |
| 11 | 69.0 | 22.5 | 4.3 | — | — | 4.2 | — | — | — | 3.38 | 91.2 |
| 12 | 70.2 | 22.1 | — | 7.7 | — | — | — | — | — | 3.63 | 92.5 |
| 13 | 92.9 | $(2.3)^a$ | 3.5 | 1.3 | — | — | — | — | — | 3.40 | 92.0 |
| 14 | 70.7 | 22.4 | 2.3 | — | — | — | — | 4.6 | — | 3.57 | 93.4 |
| 15 | 83.4 | $(8.9)^b$ | 2.2 | — | — | — | — | 5.4 | — | 2.97 | 88.5 |

-continued

| Example No. | Composition (wt. %) | | | | | | | | Density (g/cc) | Hardness (Rockwell A) |
|---|---|---|---|---|---|---|---|---|---|---|
| | Si$_3$N$_4$ | Co | Al$_2$O$_3$ | MgO | CaO | SrO | ZrO$_2$ | Y$_2$O$_3$ | SiO$_2$ | | |
| 16 | 64.2 | 22.5 | (2.3)$^c$ | — | — | — | — | (5.1)$^d$ | 5.9 | 3.20 | 88.0 |

$^a$CoO instead of Co
$^b$Fe instead of Co
$^c$AlN instead of Al$_2$O$_3$
$^d$YN instead of Y$_2$O$_3$

What we claim and desire to protect by Letters Patent is:

1. A sintered ceramic product consisting essentially of
   (a) from about 20 to about 98 percent silicon nitride,
   (b) from about 1 to about 80 percent of a silicide of at least one metal selected from the group consisting of iron, nickel and cobalt, and
   (c) from 0.02 to about 20 percent of at least one oxide, nitride or silicate of an element selected from IUPAC groups 2, 3, 4, 13 or the lanthanide series, all percentages being by weight based on the total weight of the product.

2. The sintered product of claim 1 wherein up to 50% by weight of the silicon nitride is replaced by at least one refractory carbide, nitride other than silicon nitride, or boride.

3. A process for preparing the sintered ceramic product of claim 1, said process comprising
   (1) intimately mixing a powder mixture consisting essentially of
      (a) from about 20 to about 98 percent silicon nitride,
      (b) from about 1 to about 80 percent of at least one metal selected from the group consisting of iron, nickel and cobalt, or an oxide or alloy thereof, and
      (c) from 0.02 to about 20 percent of at least one oxide, nitride or silicate of an element selected from IUPAC groups 2, 3, 4, 13 or the lanthanide series, all percentages being by weight based on the total weight of the product,
   (2) reacting the components of the powder mixture by heating to a temperature of 1300-1700° C. in a non-oxidizing atmosphere until component 1(b) is completely converted to its corresponding silicides, and
   (3) maintaining the powder mixture at temperature of 1300-1700° C. in the non-oxidizing atmosphere until the composition formed in (2) sinters.

4. The process of claim 3 wherein the heating of the powder mixture is carried out at a pressure of at least 1000 psi.

5. The process of claim 4 wherein the pressure is 2000-6000 psi.

6. The process of claim 3 wherein the non-oxidizing atmosphere is a nitrogen atmosphere.

7. The process of claim 3 wherein up to 50% by weight of the silicon nitride is replaced by at least one refractory carbide, nitride other than silicon nitride, or boride.

8. The process of claim 3 wherein the powder mixture comprises 50-93% by weight of silicon nitride, 5-25% by weight of at least one metal selected from the group consisting of iron, nickel and cobalt, 1-5% by weight of at least one oxide of IUPAC group 3 elements or the lanthanide series, and 1-5% by weight of aluminum oxide.

9. The process of claim 8 wherein fully stabilized zirconium oxide, partially stabilized zirconium oxide or hafnium oxide is substituted for all or part of the oxide of IUPAC group 3 elements or the lanthanide series.

10. The process of claim 3 wherein the powder mixture comprises 50-93% by weight of silicon nitride, 5-25% by weight of at least one metal selected from the group consisting of iron, nickel and cobalt, 1-5% by weight of at least one oxide of IUPAC group 2 elements, and 1-5% by weight of aluminum oxide.

11. The process of claim 10 wherein fully stabilized zirconium oxide, partially stabilized zirconium oxide or hafnium oxide is substituted for all or part of the oxide of IUPAC group 2 elements.

12. A cutting tool prepared from the sintered ceramic product of claim 1.

13. A cutting tool prepared from the sintered ceramic product of claim 2.

* * * * *

UNITED STATES PATENT AND TRADEMARK OFFICE
CERTIFICATE OF CORRECTION

PATENT NO. : 5,023,214

DATED : June 11, 1991

INVENTOR(S) : Roger L. K. Matsumoto and Allan B. Rosenthal

Page 1 of 2

It is certified that error appears in the above-identified patent and that said Letters Patent is hereby corrected as shown below:

Col. 1, line 52, "tools Japanese" should read --tools. Japanese--;

Col. 2, line 6, "20to" should read --20 to--;

Col. 2, line 13, "parts" should read --percentages--;

Col. 2, line 25, "parts" should read --percent--;

Col. 2, line 40, in both instances, "parts" should read --percent--;

Col. 3, line 32, "Yield" should read --yield--;

Col. 3, line 46, "meal" should read --metal--;

Col. 3, line 47, "parts" should read --percent--;

UNITED STATES PATENT AND TRADEMARK OFFICE
CERTIFICATE OF CORRECTION

PATENT NO. : 5,023,214

DATED : June 11, 1991

INVENTOR(S) : Roger L. K. Matsumoto and Allan B. Rosenthal

Page 2 of 2

It is certified that error appears in the above-identified patent and that said Letters Patent is hereby corrected as shown below:

Col. 5, Footnote c of Table, "$^C$AiN" should read --$^C$AlN--;

and

On the Title page in the Abstract of Disclosure, line 4, "parts" should read --percent--.

Signed and Sealed this

Fifteenth Day of December, 1992

*Attest:*

DOUGLAS B. COMER

*Attesting Officer*  *Acting Commissioner of Patents and Trademarks*